(12) United States Patent
Lehmann

(10) Patent No.: US 8,397,954 B2
(45) Date of Patent: Mar. 19, 2013

(54) DEVICE FOR METERING BULK MATERIAL

(75) Inventor: Rolf Lehmann, Ammerswil (CH)

(73) Assignee: K-Tron Technologies, Inc., Pitman, NJ (US)

(*) Notice: Subject to any disclaimer, the term of this patent is extended or adjusted under 35 U.S.C. 154(b) by 1162 days.

(21) Appl. No.: 10/589,062

(22) PCT Filed: Feb. 8, 2005

(86) PCT No.: PCT/CH2005/000068
§ 371 (c)(1),
(2), (4) Date: Aug. 10, 2006

(87) PCT Pub. No.: WO2005/077512
PCT Pub. Date: Aug. 25, 2005

(65) Prior Publication Data
US 2007/0170209 A1    Jul. 26, 2007

(30) Foreign Application Priority Data

Feb. 13, 2004 (CH) ......................... 219/04

(51) Int. Cl.
*G01F 11/20* (2006.01)
(52) U.S. Cl. ............... 222/236; 222/168; 414/310
(58) Field of Classification Search ............... 222/236, 222/413, 317, 368, 239–242, 167–168, 164–165, 222/325; 414/310, 306
See application file for complete search history.

(56) References Cited

U.S. PATENT DOCUMENTS

| | | | | |
|---|---|---|---|---|
| 391,907 A * | 10/1888 | Merrill | ......... | 99/443 C |
| 1,915,750 A * | 6/1933 | Nease | ......... | 110/104 R |
| 2,604,217 A * | 7/1952 | Shaw | ......... | 414/323 |
| 3,064,830 A * | 11/1962 | Reed | ......... | 414/310 |
| 3,064,831 A * | 11/1962 | Cook | ......... | 414/310 |
| 3,143,336 A * | 8/1964 | Byberg | ......... | 366/156.1 |
| 3,151,749 A * | 10/1964 | Long | ......... | 414/310 |
| 3,223,290 A * | 12/1965 | Schuld | ......... | 222/228 |
| 3,536,210 A * | 10/1970 | Dickinson | ......... | 414/310 |

(Continued)

FOREIGN PATENT DOCUMENTS

| CA | 2055289 A1 | 5/1992 |
|---|---|---|
| DE | 1087512 | 11/1957 |

(Continued)

OTHER PUBLICATIONS

Brabender-Dosier-Differentialwaage; Typ DDW-H32-DDSR40-60[110]; dated Dec. 2002; 2 pages.

(Continued)

*Primary Examiner* — Kevin P Shaver
*Assistant Examiner* — Robert Nicholas, II
(74) *Attorney, Agent, or Firm* — Morgan Lewis & Bockius LLP

(57) ABSTRACT

A device for metering bulk material includes a drive unit as well as a metering unit encompassing a metering module, a receptacle, and a stirring apparatus. A gear can be provided between the metering module and a wheel. The metering module is provided with an outlet. A quick coupling element is disposed on an axis in order for the metering unit to be designed as a replaceable unit. The metering unit can be swiveled about the axis when the quick coupling element is engaged such that the wheel can be non-positively contacted with driving means. A plate is used as a cover.

23 Claims, 3 Drawing Sheets

U.S. PATENT DOCUMENTS

| | | | | |
|---|---|---|---|---|
| 4,029,219 | A | * | 6/1977 | Rutten et al. .................. 414/308 |
| 4,332,539 | A | | 6/1982 | Zani |
| 4,386,695 | A | * | 6/1983 | Olson .......................... 198/661 |
| 4,518,262 | A | | 5/1985 | Bornemann et al. |
| 4,583,903 | A | * | 4/1986 | Hutchison ..................... 414/311 |
| 4,599,809 | A | * | 7/1986 | Parkes ............................ 34/484 |
| 4,618,304 | A | * | 10/1986 | Finger ........................... 414/306 |
| 4,665,808 | A | * | 5/1987 | Pulvermuller .................. 99/285 |
| 4,796,440 | A | * | 1/1989 | Shiotani et al. ................. 62/343 |
| 5,287,993 | A | * | 2/1994 | Ford et al. ..................... 222/135 |
| 5,339,997 | A | | 8/1994 | Billivant et al. |
| 5,447,404 | A | * | 9/1995 | Bjelkeby ....................... 414/213 |
| 6,007,011 | A | | 12/1999 | McBain |

FOREIGN PATENT DOCUMENTS

| | | |
|---|---|---|
| DE | 1087512 B | 11/1957 |
| DE | 1087512 | 8/1960 |
| EP | 0049315 | 4/1982 |
| EP | 0842626 | 5/1998 |
| FR | 2635314 | 8/1988 |
| FR | 2635314 | 2/1990 |
| JP | 07-10290 | 8/2007 |
| WO | WO 00/30517 | 6/2000 |

OTHER PUBLICATIONS

International Search Report for PCT/CH2005/000068 dated Jun. 24, 2005.

English translation of Brabender-Dosier-Differentialwaage; Typ DDW-H32-DDSR40-60[110]; dated Dec. 2002; 2 pages.

English translation of DE 1087512 B of Amadessi et al; published Nov. 4, 1957; 7 pages.

Office Action dated Oct. 22, 2010 for Japanese Patent Application No. 2006-552441.

* cited by examiner

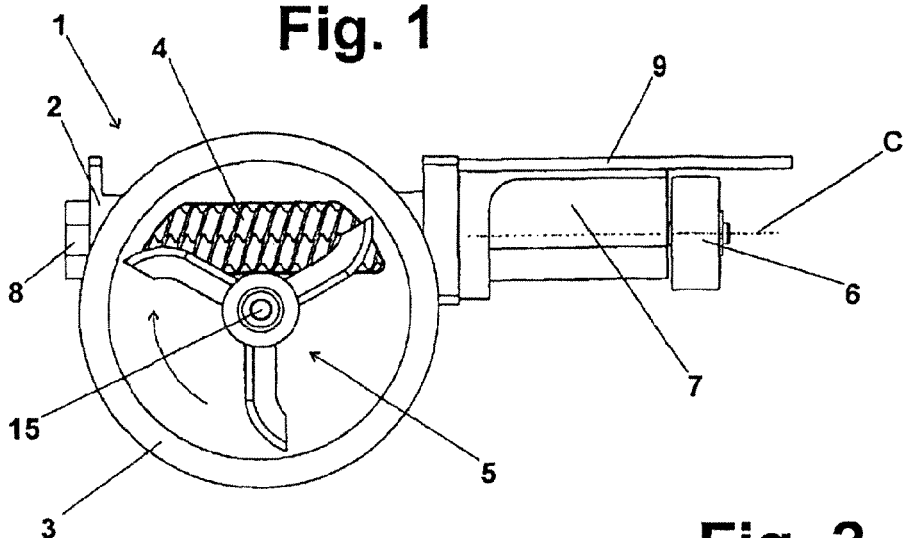
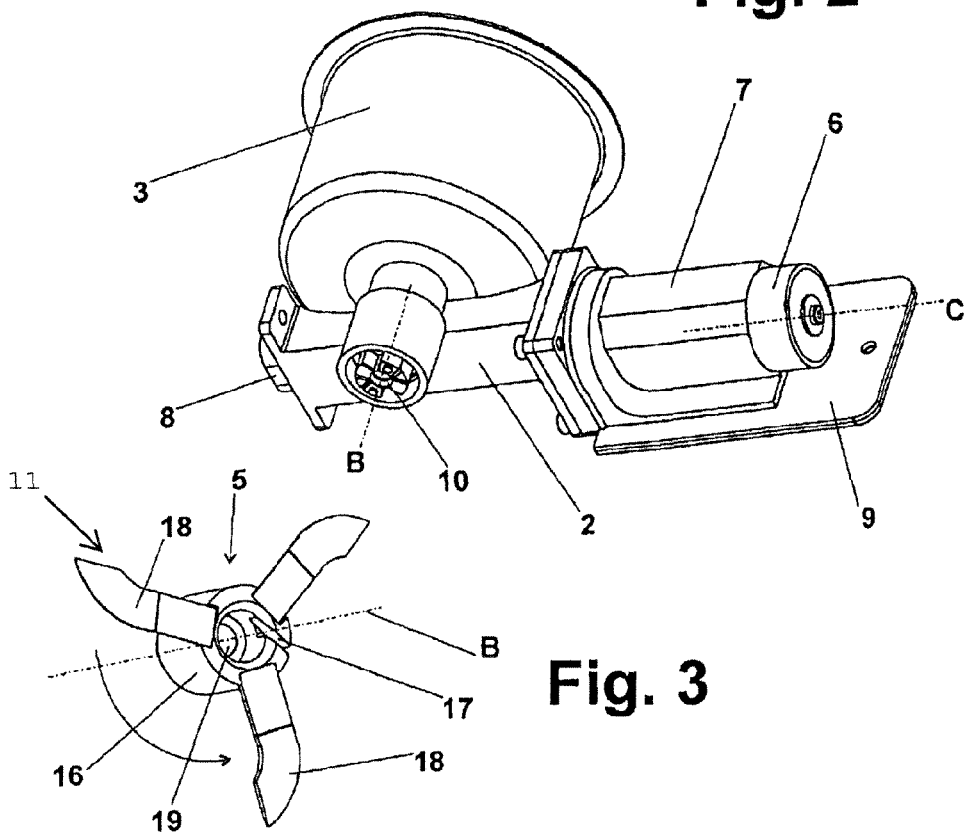

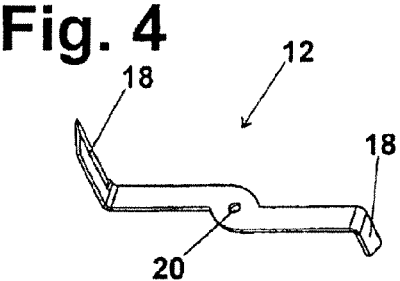
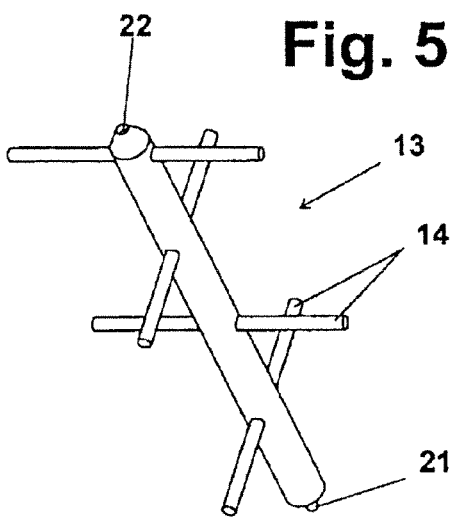
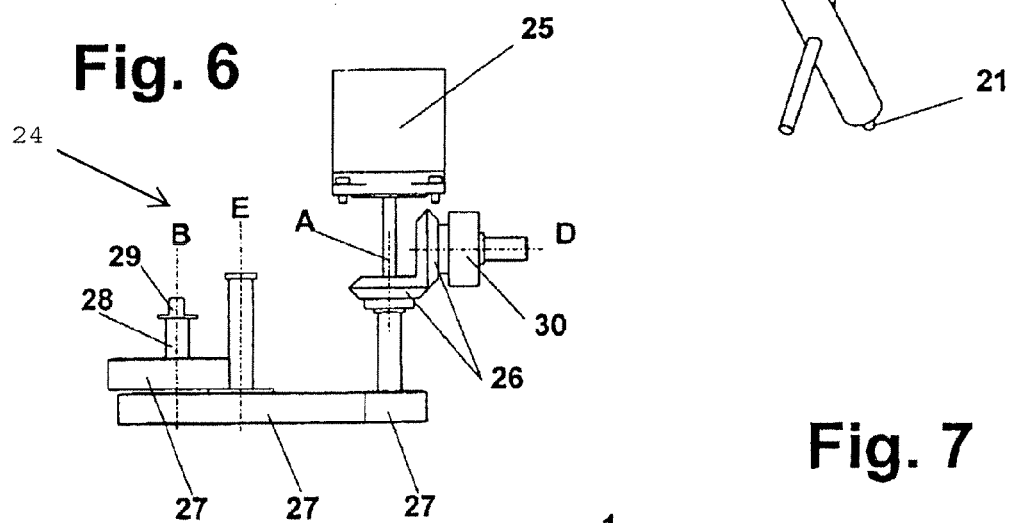
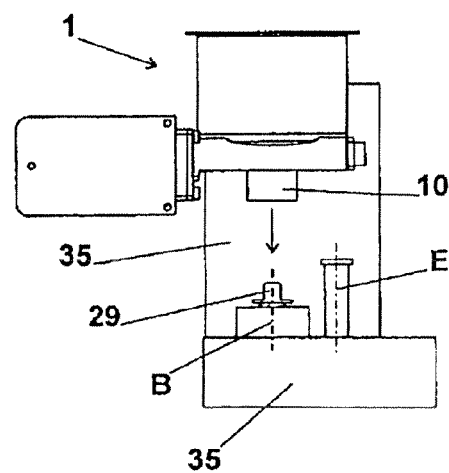

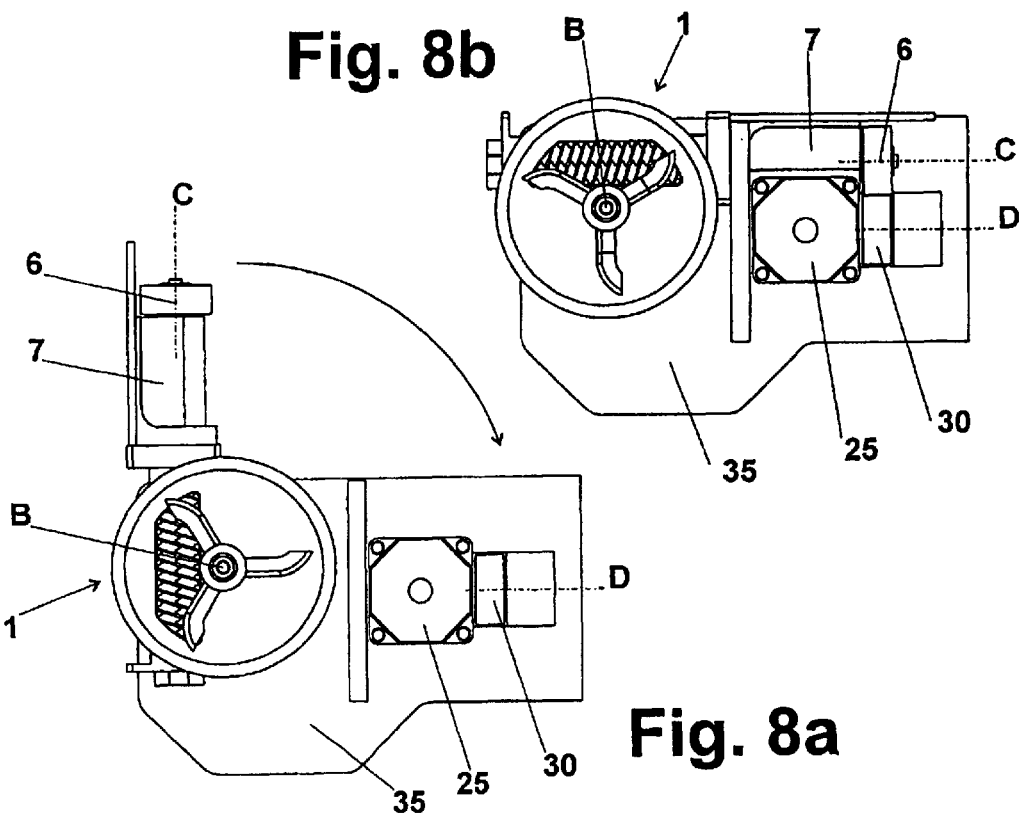
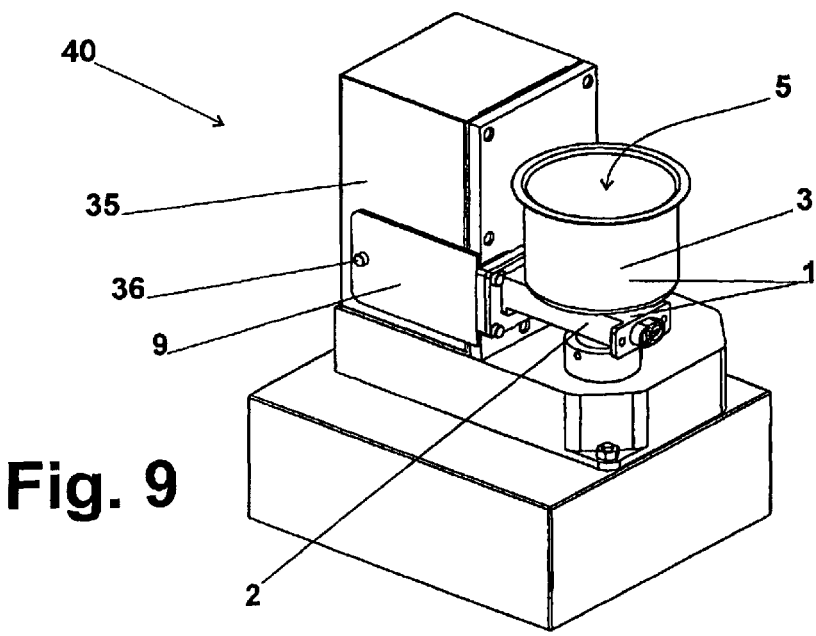

DEVICE FOR METERING BULK MATERIAL

This application claims priority to International Patent Application PCT/CH2005/000068 filed February 8, 2005 which claims priority to Switzerland application 219/04 filed on February 13, 2004 both of which are hereby incorporated by reference as if set forth in their entirety herein.

The present invention relates to a device for metering bulk material comprising a metering unit, a stirring apparatus and a drive unit according to the preamble of claim 1.

Devices for metering bulk materials belong to the general prior art and are known in many embodiments.

Closest to the present invention is the DDW-H32-DDSR40-60[110] loss-in-weight feeder from Brabender Technologie KG. This device comprises a container for bulk material with a stirring apparatus and interchangeable screw profiles. A suitable twin screw feeder can be attached and used depending on the bulk material. The screws and the stirring apparatus are each driven by a separate motor.

A disadvantage with this apparatus is the change-over times incurred when the bulk material is changed. The parts in contact with the product, that is the container, the stirring apparatus and the screws must be cleaned. In the case of expensive bulk materials, cleaning is additionally also associated with costs since some of the bulk material is lost. The two motors make the device heavy which has an unfavourable effect on the measurement accuracy in a weighing system.

It is the object of the invention to provide a device for metering bulk material where only short changeover times are incurred and no bulk material is lost through the cleaning process.

The solution of the problem is reproduced in the characterising part of claim 1 with regard to its main features, and in the following claims with regard to further advantageous embodiments.

In the present invention, the metering unit is designed as an exchangeable unit. This unit comprises all components coming in contact with the bulk materials. These are substantially a container for the bulk material together with a stirring apparatus and a metering module for metering means such as screws for example. A motor unit with a single motor drives the stirring apparatus and the metering means. The stirring apparatus is constructed from a base rotor on which a lateral rotor and/or a bridge breaker can be placed. The base rotor and the lateral rotor are configured such that they move at a short distance from the base area and an area of the side wall of the container. The mounting of the base rotor is configured so that it does not stick to the bulk material.

The invention is explained in detail with reference to the figures.

FIG. 1 shows a view from above of the metering unit 1 according to the invention for metering bulk material. The essential components are a container 3 for bulk material, a metering module 2 and a stirring apparatus 5. The metering module contains two screws 4; these are visible through a feed opening in the bottom of the container 3. The screws 4 are exchangeable and can be replaced by other screws. However, the metering module 2 can also have a single screw 4 or another metering means such as a conveyor belt, for example. The metering means are driven by means of a wheel 6. A gear, within gear casing 7, is additionally provided here between the screws 4 and the wheel 6 as shown in FIG. 1. However, the gear, within gear casing 7, can be omitted especially if only one metering means is provided in the metering module, for example, a single screw 4. In this simple case, the drive axis designated by the letter C can at the same time be the axis of rotation of the screw 4. The metering means of the metering module 2 convey the bulk material to an outlet 8.

In the figures:
FIG. 1 is a view of a metering unit from above,
FIG. 2 is a detailed view of the metering unit from below,
FIG. 3 is a view of a base rotor,
FIG. 4 is a view of a lateral rotor,
FIG. 5 is a view of a bridge breaker,
FIG. 6 is a view of a drive unit,
FIG. 7 is a first view which illustrates the process of changing the metering unit,
FIG. 8a, b show two further views which illustrate the process of changing the metering unit,
FIG. 9 is a view of a device ready for operation.

FIG. 1 shows a view from above of the metering unit 1 according to the invention for metering bulk material. The essential components are a container 3 for bulk material, a metering module 2 and a stirring apparatus 5. The metering module contains two screws 4; these are visible through a feed opening in the bottom of the container 3. The screws 4 are exchangeable and can be replaced by other screws. However, the metering module 2 can also have a single screw 4 or another metering means such as a conveyor belt, for example. The metering means are driven by means of a wheel 6. A gear, within gear casing 7, is additionally provided here between the screws 4 and the wheel 6 as shown in FIG. 1. However, the gear, within gear casing 7, can be omitted especially if only one metering means is provided in the metering module, for example, a single screw 4. In this simple case, the drive axis designated by the letter C can at the same time be the axis of rotation of the screw 4. The metering means of the metering module 2 convey the bulk material to an outlet 8.

A base rotor 11 comprising three blades 18 of the stirring apparatus 5 therewith continuously advances bulk material into the feed opening in the bottom of the container 3. In this case, the base rotor 11 in FIG. 1 is configured in the form of a three-bladed rotor. Naturally, a different number of blades or a different type of rotor, for example, a rotating net or braid, can also be used. Non-circular movements are also possible according to the invention. However, it is important to the invention that the shape of the base rotor 11 is matched to the inside of the base area of the container 3 and moves at a distance of less than 1 mm from the base area. The short distance ensures small residual quantities of bulk material which saves costs, especially in the case of expensive bulk material. In order to achieve the effect of a blade sliding over a surface, the blades of the base rotor (11) are chamfered at the front in the direction of rotation.

The metering unit 1, as is also shown in FIG. 7, is designed as an exchangeable unit and is primarily used in metering units, loss-in-weight feeders, extruders or tabletting machines. For this purpose, the B axis by which means the stirring apparatus is driven, has an axial quick coupling unit 10 at one end, as shown in FIG. 2. When the axial quick coupling unit 10 is coupled on, the metering unit 1 can be swiveled about the B axis, as is illustrated in FIGS. 8a, b. A machine equipped with metering units 1 is extremely suitable for producing mixtures of bulk material, for example, in a laboratory. A plurality of metering units 1 each contain a bulk material and are used in order in the machine. These machines can be fitted with a drive unit 24, for example, which is described further below and which advantageously cooperates with the metering unit 1. FIG. 3 shows a view of a base rotor 11 obliquely from below. The central area of the base rotor 11 is formed by a cap 16. Running centrally through the cap 16 along the B axis is a hole 19 into which a shaft 15 fits, for example, and the base rotor 11 can be affixed thereon. In the lower visible portion the hole 19 is expanded so that when the shaft is inserted, an intermediate space is formed in this lower portion between the cap 16 and the shaft 15. When the base rotor 11 is attached for operation as shown in FIG. 1, and turns, bulk material can creep into this intermediate space, especially because of the short distance from the base area of the container 3. When the base rotor 11 turns in the directions of the arrows indicated in FIGS. 1 and 3, the bulk material flows through a groove 17 provided in the lower portion of the cap 16 from the intermediate space back into the container 3. The groove 17 is arranged so that its inner end runs before the outer end in the direction of rotation of the base rotor 11 so that a direction of flow from inside to outside is predefined. The continuous flow of bulk material out from the intermediate space avoids bulk material becoming deposited on the shaft, sticking or adhering there and being able to block or damage the base rotor 11 with time.

FIG. 4 shows a lateral rotor 12 comprising two blades 18 for example. The lateral rotor can be detachably attached, for example, using a screw through a hole 20 to the cap 16 of the base rotor 11. The blades 18 are each bent outwardly upwards or downwards with respect to a vertical axis of rotation and chamfered at the front in the direction of rotation. The chamfered portions of the blades 18 are in turn substantially matched to the contour of wall areas of the container 3 or an additional container which can be placed thereon and rotate at a distance of less than 1 mm from the relevant wall area. Adhering bulk material can thereby be removed from this wall zone, for example, so that a small residual quantity can be ensured even with adhesive bulk material.

FIG. 5 shows a bridge breaker 13. In the exemplary embodiment as shown in FIG. 5, this has eight bridge breaker rods 14. At its lower end, it has a pin 21, for example. The pin 21 passes, for example, through the hole 20 of a lateral rotor 12 into a thread of the cap 16 of the base rotor 11 and into an opening 22 of another bridge breaker 13. A bridge breaker has at least one bridge breaker rod 14 or a means fulfilling the same purpose. The spacing and the number of bridge breaker rods 14 must be varied according to the bulk material. This can be achieved, on the one hand, by placing a plurality of bridge breakers 13 one above the other at corresponding heights or by displaceable attachment of more or less bridge breaker rods 14 on one or more bridge breakers 13.

The combination of the base rotor 11 with one or more lateral rotors and/or bridge breakers 13 allows the construction of various stirring apparatus suitable or optimized for specific bulk material. For example, lateral rotors 12 and bridge breakers 13 can be attached in alternating sequence on a base rotor 11. Other sequences are naturally also possible according to the invention.

Naturally, other forms of blades 18 and bridge breaker rods 14 than those in the exemplary embodiments as shown in FIGS. 4 and 5 are also possible according to the invention. For example, the blades 18 can both be bent upwards or downwards, and also matched to a curved or sloping wall area of a container 3 or an additional funnel. Also the bridge breaker rods 14 can be bent, for example, they can have transverse rods forming a rake or they can have any cross-section.

In another embodiment which is not shown, the blades 18 of the lateral rotor 12 can be configured so that they can be attached to the bridge breaker 13 like the bridge breaker rods 14. Consequently, a bridge breaker 13 thus configured then takes over the function of the lateral rotor 12 at least in part.

FIG. 6 shows a motor drive unit 24 which advantageously cooperates with an exchangeable metering unit 1 described previously and its stirring apparatus 5. The motor 25 drives an axle A. The axis B of the stirring apparatus 5 substantially parallel to the axis A is thus driven via a plurality of wheels 27. Naturally, the transmission of force from the A axis to the B axis can also be achieved by other means known to the person skilled in the art, for example, using belts or chains. A shaft 28 rotating with the B axis in turn bears an axial quick coupling unit 29. This axial quick coupling unit 29 is the counterpart to the axial quick coupling unit 10 of the metering unit 1. The motor drive unit 24 and the metering unit 1 can be interconnected by means of the axial quick coupling units 10, 29 in such a manner that the metering unit 1 can be pivoted about the B axis. A bevel gear 26 is situated on the A axis driven by the motor 25 and this bevel gear drives a second bevel gear 26 located on an axis D substantially orthogonal to the A axis. A drive wheel 30 is also situated on the D axis. The metering means of the metering module 2 can be driven by means of the drive wheel 30 via the wheel 6. Consequently, only one motor 25 is provided for driving the stirring apparatus 5 and for the drive of the metering means. As a result, the weight of the drive unit 24 can be significantly reduced, enhancing the measurement accuracy of the weighing device.

FIG. 7 shows the motor drive unit 24 from FIG. 6 in a housing 35. FIG. 7 further shows that the metering unit 1 can be connected to the motor drive unit 24 by positioning its axial quick coupling unit 10 onto the axial quick coupling unit 29 of said motor drive unit. Numerous types of axial quick coupling units are known to the person skilled in the art for this type of connection. It is important for the invention that one component 10 is attached to the metering unit 1 and one component 29 to the motor drive unit 24.

FIGS. 8a, b show the metering unit 1 and the motor drive unit 24 from above after connecting the axial quick coupling units 10, 29. The metering unit 1 can now be pivoted about the B axis so that the C and D axes come to lie in positions substantially parallel to one another. As a result, the wheel 6 and the drive wheel 30 on the C and D axes come in non-positive contact whereby the motor 25 can also drive the metering means as has already been mentioned.

In a variant to the process of connecting the metering unit 1 to the motor unit 24 shown in FIGS. 7, 8a and 8b, the housing 35 can be configured so that the metering unit 1 is inserted and coupled-in from above directly into the position shown in FIG. 8b. The turning movement shown in FIGS. 8a and 8b can then be omitted. FIG. 9 shows a device 40 ready for operation, comprising all the components according to the invention: the motor drive unit 24 is accommodated in the housing 35, the metering unit 1 for metering bulk material is inserted and the base rotor 11 is attached in the container 3. In this case, a plate 9 is connected to the housing 35 by means of a screw 36 so as to ensure a non-positive connection between the wheel 6 and the drive wheel 30. Naturally, instead of the screw 36, it is also possible to use a wing nut, a snap-fit closure, a magnet or another means commonly known to the person skilled in the art. During operation, for example, in a laboratory, mixtures of bulk materials, for example, can now be produced easily. When a predetermined amount of a bulk material has been weighed out, the machine is preferably stopped and the connection between the plate 9 and the housing 35 is released. The metering unit 1 is then pivoted out from the housing 35 for example and the axial quick coupling units 10, 29 are separated from one another so that the metering unit 1 is released from the device 49 and can be placed aside. Another metering unit 1 containing another bulk material can then be connected in a similar manner to the device 40 and the mixing process can be continued. This process can naturally be carried out using any number of metering units 1. The change-over times are extremely short and the cleaning expenditure and associated loss of material and time are not incurred until the bulk material of a metering unit 1 needs to be exchanged.

REFERENCE LIST

1. Metering unit
2. Metering module
3. Container
4. Screw
5. Stirring apparatus
6. Wheel
7. Gear casing
8. Outlet
9. Front plate
10. Quick coupling unit
11. Base rotor
12. Lateral rotor
13. Bridge breaker
14. Bridge breaker rod
15. Shaft
16. Cap
17. Groove
18. Blade
19. Hole
20. Hole
21. Pin
22. Opening
24. Drive unit
25. Motor
26. Bevel gear
27. Wheel
28. Shaft
29. Quick coupling unit
30. Drive wheel
35. Housing
36. Screws
40. Device
A. Axis
B. Axis
C. Drive axis
D. Axis
E. Axis

What is claimed:

1. A device for dosing bulk material, comprising:
a dosing unit having:
a dosing module including a drive axle,
a container for the bulk material, and
an agitator within the container, the agitator driven by an agitator axle perpendicular to the drive axle, the agitator axle and the drive axle rotatable about non-intersecting axes, the agitator being fixed relative to the agitator axle during use; and
a drive unit having a housing, the housing accommodating a drive motor and a transmission, the dosing module being detachable and reconnectable with the housing, the drive motor and the transmission configured to drive the drive axle and drive the agitator axle when the dosing module is connected with the housing, the dosing unit forming a replaceable unit which can be detached and reconnected to the drive unit,
wherein the drive unit includes the agitator axle.

2. The device according to claim 1, wherein the dosing module contains at least one screw, the device further comprising a conveyor belt for transporting bulk materials from the container.

3. The device according to claim 1, wherein the agitator has a first axis that is perpendicular to the drive axle.

4. The device according to claim 3, wherein an axial quick coupling unit is disposed on the first axis of the agitator and means for transmission of force are provided on the drive axle.

5. The device according to claim 4, wherein the axial quick coupling unit is located underneath the container.

6. The device according to claim 4, wherein the means for transmission of force to the drive axle is a first drive wheel.

7. The device according to claim 6, wherein when the quick coupling unit is coupled with the agitator, the dosing unit is pivotable about the first axis of the agitator into or out of the operating position.

8. The device according to claim 1, wherein the dosing module comprises a gear.

9. The device according to claim 1, wherein the agitator comprises a base rotor and expandable in any combination with one or more lateral rotors and bridge breakers.

10. The device according to claim 9, wherein the base rotor has a cap in a central area of the agitator through which a hole expanded in a lower portion runs along the first axis so that the base rotor can be disposed on a shaft in the container and can rotate about the first axis, wherein an intermediate space is formed in the lower portion of the cap and the cap has at least one groove in this lower portion.

11. The device according to claim 10, wherein an inner end of the groove runs before an outer end of the groove in a direction of rotation of the agitator so that bulk material located between the shaft and the cap flows back into the container as a result of rotary movement of the agitator.

12. The device according to claim 9, wherein the agitator has at least one blade which is matched to a contour of a base area of the container and rotates about the first axis at a distance of less than 1 mm from a bottom area of the container.

13. The device according to claim 9, wherein a lateral rotor has at least one blade which is matched to the contour of a wall area of the container or an additional funnel and moves at a distance of less than 1 mm from the wall area, whereby bulk material is removed from the wall area.

14. The device according to claim 9, wherein the bridge breakers have at least one bridge breaker rod, wherein the bridge breakers are configured so that a spacing between the bridge breaker rods of one or more bridge breakers is variable.

15. The device according to claim 1, wherein a single motor drives the agitator and the dosing module.

16. The device according to claim 15, wherein the drive axle rotates about a first axis, the drive motor rotates a drive wheel about a second axis, and the axle of the agitator rotates about a third axis in an operating position, the first and second axes being substantially parallel to one another and each substantially orthogonal to the third axis in the operating position.

17. The device according to claim 16, wherein the drive wheel is coupled to the drive motor through first and second bevel gears, the second bevel gear rotating about the second axis and the first bevel gear rotating about a fourth axis, the fourth axis being substantially orthogonal to the second axis.

18. The device according to claim 17, wherein the drive wheel directly drives the drive axle.

19. The device according to claim 16, wherein the drive wheel drives a driven wheel on the drive axle.

20. A device for dosing bulk material, comprising:
a dosing unit having
a dosing module including a drive axle;
a container for the bulk material; and an agitator within the container, the agitator driven by an axle perpendicular to the drive axle of the dosing module; and a drive unit having a housing, the housing accommodating a drive motor and a transmission, the dosing module being detachable and reconnectable with the housing, the drive motor and the transmission configured to drive the drive axle and the axle of the agitator when the dosing module is connected with the housing, the dosing unit forming a replaceable unit which can be detached and reconnected to the drive unit, wherein a single motor drives the agitator and the dosing module, wherein the drive axle rotates about a first axis, the drive motor rotates a drive wheel about a second axis, and the axle of the agitator rotates about a third axis in an operating state, the first and second axes being substantially parallel to one another and each substantially orthogonal to the third axis in the operating state, and wherein the drive wheel is coupled to the drive motor through first and second bevel gears, the second bevel gear rotating about the second axis and the first bevel gear rotating about a fourth axis, the fourth axis being substantially orthogonal to the second axis.

21. The device according to claim 20, wherein the drive wheel directly drives the drive axle.

22. A device for dosing bulk material, comprising:
a dosing unit having
a dosing module including a drive axle,
a container for the bulk material, and
an agitator within the container, the agitator driven by an agitator axle perpendicular to the drive axle, the agitator axle and the drive axle rotatable about non-intersecting axes, the agitator being fixed relative to the agitator axle during use; and a drive unit having a housing, the housing accommodating a drive motor and a transmission, the dosing module being detachable and reconnectable with the housing, the drive motor and the transmission configured to drive the drive axle and drive the agitator axle when the dosing module is connected with the housing, the dosing unit forming a replaceable unit which can be detached and reconnected to the drive unit, wherein a single motor drives the agitator and the dosing module, wherein the drive axle rotates about a first axis, the drive motor rotates a drive wheel about a second axis, and the axle of the agitator rotates about a third axis in an operating position, the first and second axes being substantially parallel to one another and each substantially orthogonal to the third axis in the operating position, and wherein the drive wheel is coupled to the drive motor through first and second bevel gears, the second bevel gear rotating about the second axis and the first bevel gear rotating about a fourth axis, the fourth axis being substantially orthogonal to the second axis.

23. The device according to claim 22, wherein the drive wheel directly drives the drive axle.

* * * * *